United States Patent [19]

McKee

[11] 4,395,089

[45] Jul. 26, 1983

[54] CLAMP CONSTRUCTION FOR USE IN OPTICAL FIBER CABLES

[75] Inventor: William H. McKee, West Covina, Calif.

[73] Assignee: TRW Inc., Elk Grove Village, Ill.

[21] Appl. No.: 159,716

[22] Filed: Jun. 16, 1980

Related U.S. Application Data

[63] Continuation-in-part of Ser. No. 943,153, Jun. 11, 1979.

[51] Int. Cl.³ ............................................... G02B 7/26
[52] U.S. Cl. .................................................. 350/96.20
[58] Field of Search ........................ 350/96.20, 96.21; 174/191, 197; 285/125, 236, 242, 420

[56] References Cited

U.S. PATENT DOCUMENTS

| 4,140,365 | 2/1979 | Burger et al. | 350/96.20 |
| 4,147,405 | 4/1979 | Spainhour | 350/96.21 |
| 4,247,163 | 1/1981 | Lumpp et al. | 350/96.21 |

FOREIGN PATENT DOCUMENTS

| 2237445 | 2/1974 | Fed. Rep. of Germany | 350/96.21 |
| 2516662 | 7/1976 | Fed. Rep. of Germany | 350/96.21 |

Primary Examiner—John D. Lee
Attorney, Agent, or Firm—Neuman, Williams, Anderson & Olson

[57] ABSTRACT

An improvement for a cable clamp which is particularly adapted for use in connection with optical fiber cables is provided. The clamp comprises twin hermaphroditic half portions which intermate and are pivotally movable relative to each other to define two sets of clamping jaws which open and close simultaneously as a result of a scissorlike pivot connection. A locking band such as a threaded nut locks the jaws at one end of the clamp together to securely engage an optical fiber cable sheath and simultaneously to secure an optical fiber of such cable at the opposed end. The improvement resides in the pivotal hinge elements interconnecting the two jaws of the clamp, the hinge elements being formed integrally with the jaw elements in complementary fashion to provide the scissorlike hinge action which facilitates the entry and clamping of the inserted optical fiber and cable by the half portions. The pivotal hinge elements are spaced from the central axis of the clamp assembly and are totally separated from the optical fiber both during engagement of the cable and upon final assembly.

15 Claims, 12 Drawing Figures

U.S. Patent  Jul. 26, 1983  Sheet 1 of 2  4,395,089
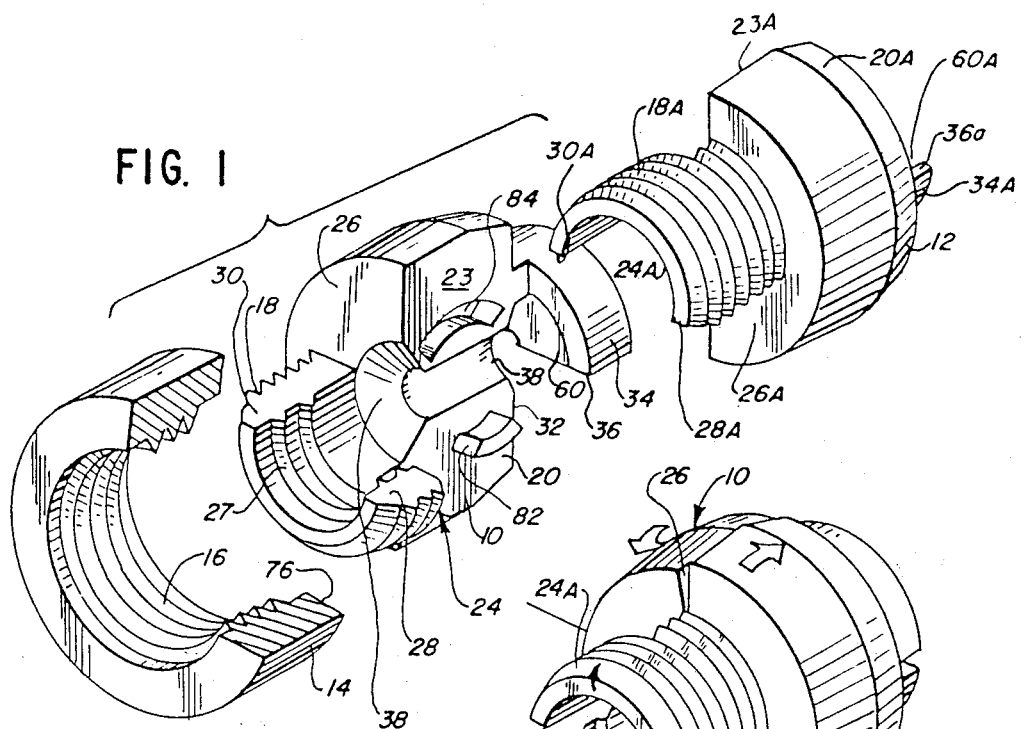
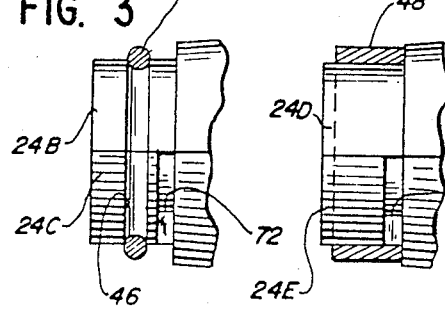
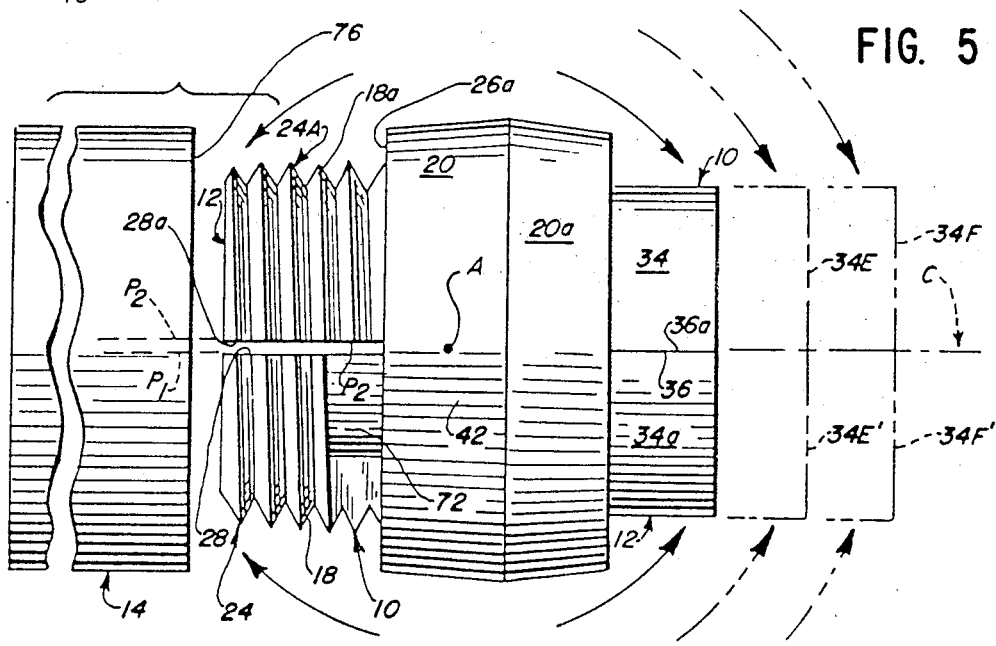

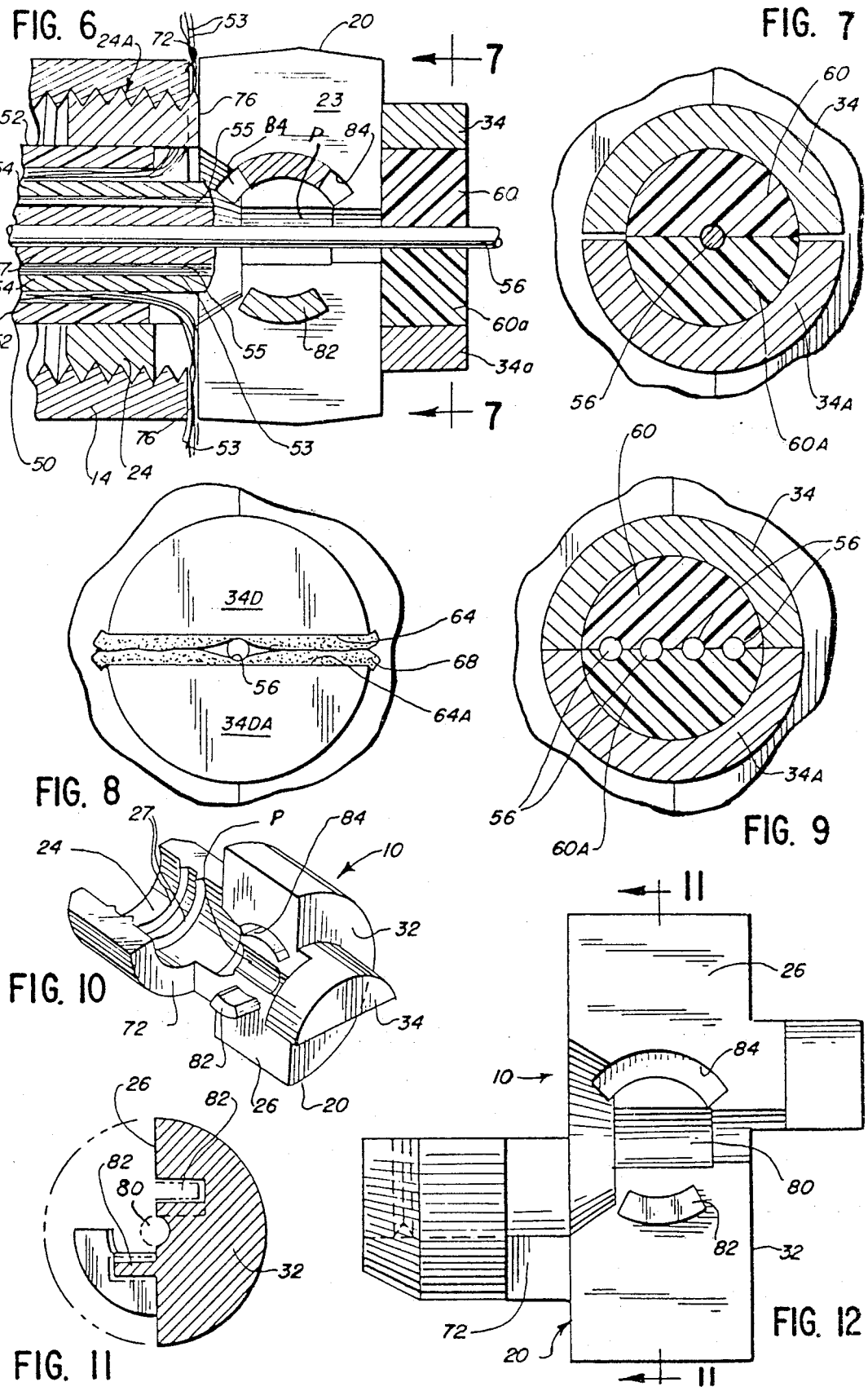

CLAMP CONSTRUCTION FOR USE IN OPTICAL FIBER CABLES

This is a continuing application of Ser. No. 943,153 filed June 11, 1979 and as filed Sept. 18, 1978.

This invention relates to a cable clamp and particularly to a clamp adapted to securely engage both the outer sheath and inner glass fiber of an end portion of an optical fiber cable.

The improved clamps of this invention may be incorporated in plug and receptacle portions of an optical fiber connector for effecting an optical signal transmissive connection between the ends of optical fibers.

In the copending application of Robert E. Lumpp and Mark Margolin filed concurrently herewith and entitled CLAMP CONSTRUCTION (now U.S. Pat. No. 4,247,163), an optical fiber cable termination is disclosed which consists of four basic pieces included are a pair of interlocking and complementary half portions which pivot with respect to each other in a scissorlike assembly, a pivot pin interconnecting the half portions, and a locking means for securing the half portions in clamping engagement around the fiber and its cable. In its assembled configuration the pivot pin extends directly across the path of the minute optical fiber or fibers in the case of multi-fiber cables. The pivot pin is therefore adapted to allow passage of the fiber or fibers in a transverse direction and is provided with a hole, or slot in the case of multi-fiber use, for this purpose.

In terminating a fiber cable in an assembly of the foregoing construction, the pivot pin must be carefully aligned with respect to the mating clamp halves so that the fiber accepting hole in the pin is disposed coaxial with the entire clamp assembly. The minute optical fibers must, of course, be threaded through the pivot pin. Each of these tasks requires substantial manual effort and assembly time. Once mated to each other and to the pivot pin, the clamp halves may operate in a scissorlike manner about the pivot pin through which the fiber is threaded. The pin must remain essentially fixed with respect to the fiber. Any binding that may occur between the pin and either of the clamp half portions places a crimping or pinching force on the delicate optical fiber which may affect the light conducting properties or mechanical integrity of the fiber.

The present invention alleviates the aforesaid drawbacks of the scissorlike optical fiber clamp through a construction which eliminates the need for a pivot pin altogether. It is a general object of the present invention to provide integral pivot elements in a clamp construction and to eliminate the pivot pin incorporated in earlier constructions of a scissorlike cable clamp without impairing the ability of the clamp to make a positive termination on the fiber cable.

More specifically, it is an object of the present invention to provide an improved clamp for optical fiber clamps which has a minimum of discrete parts.

A further object of the present invention is the provision of a cable termination clamp providing a minimum hazard to the cable itself from assembly or use of the clamp.

It is another object of the present invention to provide an improved fiber optic terminating clamp which is simple and inexpensive to manufacture, as well as easy to use.

It is a related object to provide a terminating clamp that is readily disengaged from the cable with a minimum of time and effort.

These and other objects and advantages are achieved in the present invention by the provision of a terminating clamp for coaxial fiber optic cables which consists of only three principal parts, a pair of interlocking and complementary half portions and a locking band. Scissorlike clamping of the cable is effected through hinged or pivot means in the form of integral projections and corresponding recesses extending along the mating faces of the half portions. The hinge projections formed on each half portion intermate with corresponding recesses or channels of arcuate shape formed in the face of the opposing half portion, the hinge projections and channels being spaced from the central axis of the clamp assembly so as not to interfere in any way with the light fiber passing along the axis of the clamp.

The channels formed in the mating faces of each half portion have a greater arcuate length than the corresponding projections of the complementary half portion so as to allow for relative movement of the two half portions with respect to each other in the desired scissorlike fashion in effecting termination of the cable.

For a more complete understanding of this invention, reference will now be made to the drawings wherein:

FIG. 1 is an exploded view of the components of one embodiment of a clamp construction made in accordance with the teachings of this invention;

FIG. 2 is a perspective view of the clamp elements of FIG. 1 in assembled relationship;

FIG. 3 is a fragmentary elevational view of one end portion of a modified clamp construction made in accordance with this invention illustrating an O-ring type clamping means for retaining the clamp half portions in assembled relationship;

FIG. 4 is a view similar to FIG. 3 illustrating a band means employed in an embodiment of the clamp construction made in accordance with the teachings of this invention for maintaining the half portions of the illustrated clamp construction in assembled relationship;

FIG. 5 is an enlarged side elevational view of the twin half portions of the clamp elements of FIG. 1 illustrated in assembled relationship, the retaining band of FIG. 1 being fragmentarily illustrated in spaced relationship. FIG. 5 also illustrates in phantom line possible clamp-half modifications effected by extending the right hand portions of the illustrated clamp-half portions so as to effect a modified clamp action on centrally disposed engaged cable portions;

FIG. 6 is a fragmentary, transverse sectional view of a cable clamp made in accordance with this invention in engagement with an optical fiber cable;

FIG. 7 is a transverse sectional view taken on line 7—7 of FIG. 6;

FIG. 8 is a view similar to FIG. 7 illustrating a modified type of clamping jaw at one clamp end portion;

FIG. 9 is a view similar to FIG. 7 on which a plurality of optical fibers of a multi-fiber cable are clamped;

FIG. 10 is a perspective view illustrating the slotted hinge structure formed integral with the half elements and enabling mated elements to pivot relative to each other;

FIG. 11 is a transverse sectional view illustrating the clamp hermaphoditic half elements of FIG. 10 in mating engagement; and FIG. 12 is an enlarged side elevational view of the clamp element of FIG. 10.

Referring now more particularly to FIG. 1, an exploded view is presented of various elements employed in forming one embodiment of a clamp construction made in accordance with this invention. In FIG. 1 clamp half portions 10 and 12 are of identical construction and they appear in longitudinally spaced relationship rotated 180° apart about a longitudinal axis on which the halves 10 and 12 are assembled. Also illustrated in FIG. 1 is a broken away locking or retaining ring 14 having female tapered threads 16 adapted to threadedly engage male threads 18 and 18A extending from central body portions 20 and 20A of the halves 10 and 12 respectively. The halves 10, 12 are illustrated in the assembled relationship in FIG. 2 in open position.

It will be noted from FIG. 1 that the male threads 18 are formed about the exterior periphery of semicylindrical projection 24 extending from planar face 26 of the central body portion 20 of the clamp half 10. Cylinder edges 28 and 30 lie in a horizontal plane P1 (FIG. 5) slightly offset below from central longitudinal axis C (see FIGS. 2 and 5) of passageway P defined by the clamp elements in the assembled position of FIG. 2 or in a plane coincident therewith. Edges 28A and 30A of clamp jaw 24 lie slightly above axis C to provide a additional inter-jaw space in which the optical fiber cable periphery will be engaged.

Extending from end surface 32 of the central body portion 20 of clamp half 10 is a C-shaped semicylindrical projection or half ring 34 having a resilient insert 60 and opposed terminal edge surfaces 36 which lie in a plane (see FIG. 5) disposed substantially coincident with central passageway axis C. It will be noted from FIG. 1 that the terminal edges 36 of the half ring 34 face in a downwardly direction opposite to the upwardly facing direction of end surfaces 28 of semicylindrical projections 24 of the clamp half 10 therein, having insert 60. Also, the terminal edges 28, 30 and 36 are substantially normal to the intervening diametral face 26 of the central body portion 20.

Clamp twin half 12 has structural features which are identical with the above-described structural features of clamp half 10 and bear the same identifying numeral in the various figures of the drawing together with the subscript A.

In the normal course of assembly of the clamp halves 10 and 12 of FIG. 1, the halves are intermated by butting the planar surfaces 23, 23A (the latter surface being hidden in FIG. 1 because of the perspective) of the half body portions 20, 20A with the corresponding cylinder and ring ends in abutting or adjacent relationship. In mated relationship the clamp half portions assume the assembled conditions illustrated in FIGS. 2 and 5.

As thus far described, the clamp construction of the present invention is identical to that disclosed in the copending application of Lumpp and Margolin entitled CLAMP CONSTRUCTION. It will be noted further that the embodiment disclosed in FIGS. 1-6 of that application provides for a scissorlike action of the twin clamp halves 10 and 12 about a separate central pivot pin which extends across and perpendicular to the major axis C of the clamp. In that same embodiment the separate pivot pin has a hole formed therein which, in the assembled condition, is coaxial with the central axis C and which must be properly aligned to receive the central optical fiber therethrough.

In accordance with the present invention, however, pivot or hinge means are provided which are integral with the clamp half portions 10 and 12, thus dispensing with the need for a separate pivot pin and eliminating the assembly step of threading the optical fiber through the small pin.

To this end, the clamp construction shown in FIG. 1 includes a projecting stud member 82 of arcuate configuration extending from the planar surface 26 of central body portion 20 of the clamp half 10. Stud 82 is disposed on one side of a longitudinally extending passageway P which extends coaxially through the central body portion 20. Disposed on the opposite side of passageway P from the projecting stud 82 is a complementary recess 84 adapted to receive a projecting stud 82 of a cooperating clamp half identical to the construction of clamp half 10.

The pivot or hinge element 82 and its corresponding aperture 84, as well as the operation of these elements, are shown in more detail in FIGS. 6,10 and 12. It will be seen from FIG. 12 that the arcuate stud 82 and aperture 84 define a partial cylinder transverse to the passage P and provide a central transverse pivot axis intersecting the center axis of passage P. The aperture 84 is of a slightly greater arcuate width than the width of the arcuate stud 82 (see FIG. 11) to permit limited pivotal movement between mated halves. Thus, the joined sections pivot about a transverse axis A to effect their desired scissor-like action. Clamp element 10 when in the mated condition has the distal edges of the projecting cylindrical portions in substantially parallel or radial planes similarly to the distal edges of the clamp half semicylindrical elements illustrated in FIG. 5. Thus the clamp elements 10 and 12 may pivotally move on one another about the noted transverse axis for purposes of effecting clamping and release engagements with optical cable members and their elements. Such action simultaneously effects a plurality of clamping actions with both the cable sheath of an optical cable and the innermost optical fiber itself in the manner described below with respect to FIGS. 1-9. It will be noted from FIG. 5 that in mating the clamp halves 10, 12, distal edges 36A of the half ring 34A of the clamp half 12 will also lie in the plane of central axis C. Distal edges 28A-30A of the semicylindrical threaded projection 24A of the clamp half 12 may be spaced in a plane from axis C as are edges 28-30 for the reason above given.

FIG. 2 illustrates the clamp halves 10-12 in open position for receiving an optical fiber cable to be clamped. The maximum open position of the opposed jaws 24-24A and 34-34A is determined by engagement of the planar clamp half surfaces 26-26A with projecting clamping jaw portions of the mated clamp half. FIG. 2 illustrates the scissor-like action whereby the opposed clamping jaws simultaneously open; FIG. 5 illustrates the ability of such jaws to simultaneously close.

It will be noted from FIG. 5 that if a cable is passed through the left end of the passageway P defined by the opposed threaded hemispherical clamp portions 24 and 24A and the latter portions are rotated toward each other about the jaw pivot axis A, a clamping engagement is exerted on a peripheral portion of an interposed cable. Raised ribs 27 formed on the inner arcuate surfaces of clamp portions 24, 24A assist in preventing relative movement between the engaged cable and the closed clamp jaws 24, 24A.

It will also be noted from FIG. 5 that inasmuch as the half portion 34 is integrally formed with threaded semicylindrical portion 24 of the clamp half 10, as the clamp cylindrical portion 24 approaches the half cylindrical portion 24A of clamp half 12, simultaneously ring portion 34 is pivoted downwardly in FIG. 5 to approach ring portion 34A of clamp half 12. Thus clamping action is simultaneously effected at opposed clamp end portions defining the end limits of the passageway P passing through the clamp assembly of FIGS. 2 and 5. Similarly, if it is desired to release the opposed clamping jaws of the clamp halves which clamping jaws are defined by the semicylindrical portions 24 and 24A at one end of the semi-ring portions 34 and 34A at the opposite end, the two clamp halves are pivoted away from each other simultaneously at opposed ends about the pivot axis A.

A means for urging the semicylindrical threaded portions 24 and 24A of the clamp halves 10 and 12 together may comprise the internally threaded ring 14 illustrated in FIGS. 1 and 5. The ring threads 16 as well as the clamp half threads 18 and 18A may be tapered. As the ring 14 is threaded home about the threads 18 and 18A, clamp half portions 24 and 24A are urged together into clamping engagement with a cable member disposed therebetween.

It should be appreciated that the semicylindrical clamping portions 24 and 24A need not be externally threaded for purposes of engaging a means urging the same together, but rather the half cylinder clamping jaws 24 and 24A may have a peripheral groove 46 as illustrated in the embodiment of FIG. 3 in which an O-ring 44 may be disposed for clamping half end portions 24B and 24C together. As another alternative, a flat resilient band 48 may be snugly disposed about the periphery of clamping, semicylindrical portions 24D and 24E as illustrated in FIG. 4.

The design of the present clamp construction provides the desired resulting clamping force at clamping ring portions 34 and 34A by predetermined location of the distance of such clamping from the fulcrum pivot axis A. Assuming that the length of clamping ring portion 34 of clamp half 10 were extended to 34E, and assuming that the length of clamping ring portion 34A of the clamp half 12 were similarly extended to 34E' as illustrated in FIG. 5, the force exerted by such clamping jaws would be proportionately decreased with the increased jaw distance from the pivot axis A. Such decreased force would result from the increased lever arm, assuming that the clamp jaw ends 24 and 24A remained unaltered as illustrated in FIG. 5. The extension of the jaw 34 to the length 34F' provides lesser clamping force due to the greater distance from the pivot axis P; matching clamping jaw 34F' of the clamp half 12 would be similarly extended. It is thus seen that the clamp hermaphroditic half portions comprise intersecting lever arms arranged about a pivot in scissorlike fashion. The force applied at the lever ends or jaws opposed to those end jaws at which the force is applied is dependent upon the distance from the fulcrum pivot axis A.

FIG. 6 is a transverse sectional view illustrating the assembled clamp components previously described in clamping engagement with an optical fiber cable 50 having an outer sheath 52 defining its maximum diameter, and strength members 53 comprising filaments of high tensile strength interposed the outer sheath member 52 and an intermediate sheath 54. A second annulus of strength members 55 is disposed between sheath 54 and innermost sheath 57. The cable is of a type sold under the brand name Siecor by Siecor Cables Inc. of Horseheads, New York in which an optical glass fiber 56 which may be approximately five-thousandths inch diameter is disposed. As above mentioned, the optical fiber 56 in cables such as illustrated cable 50 is relatively movable with respect to the concentric sheath members and strength filaments. It therefor is desired in clamping arrangements of such optical fiber cables to not only effect a clamping action on the outer cable periphery but in addition to effect a clamping action on the innermost optical fiber such as fiber 56 itself without damage thereto.

After the appropriate stripping of a length of overlying sheaths 52, 54 and 57 as well as lengths of strength members 55, the exposed filament 56 may be inserted in the passageway P and then between plastic inserts 60 and 60A secured to the inner periphery of the opposed clamping jaws 34 and 34A of the clamp half portions 10 and 12 respectively. In such a clamping arrangement precise location of the optical fiber is always assured without danger of movement of the fiber relative to the enveloping clamp with resulting deterioration of a connection which may have been made between the ends of a pair of optical fibers. Thus in FIG. 6 the clamping semicylindrical jaws 24 and 24A are urged together by enveloping, threadedly engaged ring 14 into gripping engagement with the outer sheath 52 of the optical cable 50. However, the innermost optical fiber 56 may normally readily axially move relative to the concentric sheaths and strength members 54. The provided clamp prevents such undesired relative movement by clampingly engaging not only the outermost optical cable periphery (at the left end in FIG. 5) but in addition the fiber 56 itself.

It will be noted from FIG. 7 that plastic inserts 60 and 60A completely surround the glass filament 56, frictionally engaging the same and exerting a uniform "hydraulic-like" pressure about the entire periphery of the glass fiber 56 traversing the thickness of the plastic inserts 60 and 60A. As a result of this desired clamping engagement, the glass filament is securely locked in place and prevented from axial movement relative to the clamp. The plastic inserts 60 and 60A are securely adhered to the inner peripheral surfaces of the half rings 34, 34A and may comprise elastomers which may have entrapped air to render the same readily conformable to the peripheral configuration of the glass fiber. Such resultant gripping action obviates any possibility of crushing pressures being exerted on the periphery of the glass fiber which would detrimentally alter the light-conveying characteristics of such fibers. Such loss may be occasioned by causing molecular flow of the filament or crushing of the filament 56 so as to deleteriously affect its light-conveying ability. Obviously other configurations for the fiber-clamping jaws may be employed in the provided clamp with a large variety of inserts effecting the desired gripping engagement with the filament 56. The material of fabricaion of the clamp halves may for example, be metal or one of a variety of plastics. Jaws formed of certain plastics may effect fiber-engaging functions without the necessity for a separate insert.

As an alternative to the use of the plastic inserts 60 and 60A of FIGS. 6 and 7, the clamping rings 34, 34A and their plastic inserts 60, 60A may be substituted by solid disc halves 34D and 34DA (see FIG. 8). Secured to the diameter-defining edges 64A and 64 of the clamping halves 34DA and 34D, respectively are layers of adhesive-coated plastic tape 68. The thicknesses of the tape are adequate to serve as a positive stop preventing pressures from being exerted on the interposed glass fiber 56 adequate to effect undesired flow or fracture thereof which could result in a deterioration in lightcoveying characteristics. The fiber 56 is securely restrained by tape 68 against axial movement.

If the glass fiber such as fiber 56 is not readily moved relative to the innermost plastic sheath 57, jaws 34–34A of the clamp halves 10 and 12 of FIG. 1 may be altered in configuration so as to snugly engage the periphery of the optical cable inner sheath 57.

An additional clamping action, between the inner planar surface 76 of threaded ring 14 and planar end surfaces 26 and 26A of the center housing portions 20 and 20A of the clamp halves 10 and 12, respectively is carried out when the strength fibers 53 interposed the intermediate and outermost sheaths 54 and 52 of the illustrated optical cable construction are led through gaps 72 in sections 24, 24A as clearly seen in FIGS. 4 and 6 of the drawing. The strength members 53 comprising plastic filaments are led through the openings 72 and then securely clamped between the abovementioned surfaces 76, and 26 and 26A when the ring 14 is seated against the center sections 20, 20A. Inner strength members 55 interposed sheaths 54 and 57 may be similarly engaged if additional securement of the clamped cable portion is desired. If not, they are trimmed adjacent clamp opening 72, as illustrated. The terminal ends of the strength members 53 may then be trimmed so as to not extend beyond the periphery of the clamp assembly.

Accordingly, in addition to the cable and filament clamping actions above described and which are carried out at the opposed ends of the provided clamp construction, a third clamping action may be effected on the strength members normally found in an optical cable of the type intended to be employed with the provided clamp.

It is seen from the foregoing that clamps provided in accordance with this invention are of extremely simple construction, consisting essentially of only three parts. The clamp is formed from hermaphroditic, twin half portions which pivot with respect to each other in a scissor-like manner via a hinge assembly which is formed integral with the half portions themselves. The only other principal element is a final clamping or retaining band or nut that locks the scissor-like half portions in the closed position. The clamp is extremely versatile in operation, being adapted to readily secure either sheath portions of an optical cable or a sheath portion and the innermost optical fiber. Cable constructions may vary from that illustrated; thus the number of concentric sheaths and strength fiber layers may vary from those of the illustrated cable 50. The provided clamp is readily adaptable to varying cable constructions by virtue of its adjustable jaws at opposed ends. The engagement of the optical fiber by the provided clamp is in such manner so as to ensure the absence of damage thereto. The provided clamp construction may be readily assembled with and disassembled from an engaged optical fiber cable portion and requires the preparation of only a relatively short length of the engaged cable portion in order to be in secure engagement therewith.

Although the foregoing description has referred to optical cables having a single optical fiber, the provided clamp will, of course, work to advantage in multi-fiber cables. Thus, in FIG. 9 four fibers are retained between clamp jaws 34–34A having resilient, plastic inserts 60–60A therein. When employed with multi-fiber cables the clamp passageways must, of course, be of adequate size to allow passage of the fibers and slots 72 of adequate size to allow passage of the desired number of strength filaments for desired clamping action. The elimination of the central pivot pin used in the prior clamp construction greatly facilitates the use of the clamp for multi-fiber cables, since the assembly step of threading the fiber through a central pin is no longer necessary. Of course, the use of multi-fiber cables increases the importance of avoiding hazards that might arise from the crimping of many fiber conductors during mechanical misalignment or binding of the clamp components. With the hinge or pivot elements 82, 84 of the present invention spaced well away from the conductor engaging channel 80, the likelihood of crimping the conductors is greatly reduced. Obviously, the reduction of human manipulation of the fibers which is realized through the improvement of the present invention also greatly reduces the possibility of damage to the conductors of a multi-fiber cable.

The provided clamp construction is adaptable for use not only with an optical fiber cable but also has application for engagement with corresponding elements of electrically conducting cables such as coaxial cables wellknown in the art. Clamps employed in such applications would be formed at least in part of dielectric material. It is believed that the foregoing description has made apparent a number of modifications which fall within the ambit of the invention disclosed. Accordingly, this invention is to be limited only by the scope of the appended claims.

What is claimed is:

1. A clamp for a cable of multiple elements, comprising twin halves configured for assembly in a pivotal scissorlike relation; said halves defining a passageway therethrough for a cable to be clamped by said halves in such relation; opposed ends of said clamp halves defining the opposed ends of such passageway also defining clamping jaws for clampingly engaging portions of a cable located therebetween: said clamping jaws of said opposed clamp ends being simultaneously movable toward and away from each other; each of said twin halves having an arcuate recess disposed therein and a projecting lug formed in opposed relation on opposite sides of said passageway; the lug of each clamp half being received in the arcuate recess of the other clamp half and coacting therewith whereby said clamp halves may effect such pivotal relation.

2. A clamp comprising intermating twin half portions each having an opposed pair of cooperating clamping jaws spaced apart by an intermediate body portion; the distal ends of the jaw pairs defining spaced end limits of said clamp; each of said half portions having pivot means comprising an arcuate recess disposed therein and a projecting lug formed in opposed relation on opposite sides of the central longitudinal axis of said clamp, the arcuate recess of each clamp half portion being adapted to receive the lug of the other clamp half portion whereby each clamp half portion may pivotally move relative to the other; each clamp half portion having opposed clamping jaw portions facing in opposite directions relative to one another; the cooperating clamping jaws of said clamp ends being simultaneously movable toward each other for purposes of effecting simultaneous clamping action and being simultaneously movable away from each other for purposes of effecting a simultaneous clamp-release action in the normal course of clamp half portion pivotal movement about said pivot means.

3. A clamp element adapted to mate with a duplicate of said element comprising a central body portion; said central body portion having a substantially planar width-defining face and having a central hollowed out portion disposed in said planar face and extending across the width of said body portion; said body portion having spaced faces on opposite ends of said planar face; clamping jaws having clamping faces extending from said spaced faces of said central body portion; said clamping faces facing in opposite directions relative to one another; approximately one-half of one end of each clamping jaw being integrally formed with the body portion from which projecting; the remaining one-half of said one end being spaced from said central body portion; said clamp element having an arcuate recess disposed in and a lug projecting from said planar face in opposed relation on opposite sides of said hollowed out portion; the arcuate recess of said clamp element being adapted to receive the lug of a like mating clamp element whereby such mated clamp elements may pivot relative to each other in a scissorlike manner.

4. The clamp element of claim 3 in which one of said clamping jaws is relieved at said spaced one end.

5. A clamp particularly adapted for clamping in fixed relation concentric elements of an optical fiber cable or the like, comprising clamp portions pivotally engaged in scissorlike manner; opposed ends of said portions defining pairs of clamping jaws which are simultaneously movable into clamping and release positions relative to one another in the course of pivotal movement of said clamp portions; said clamp portions defining a passageway extending between said clamping jaw pairs; each of said clamp portions having an arcuate recess disposed therein and a projecting lug formed in opposed relation on opposite sides of said passageway; the arcuate recess being adapted to receive the corresponding lug of the other clamp portion whereby said clamp portions may effect such pivotal engagement.

6. A clamp as in claim 5 wherein said clamp portions are identical to one another.

7. In combination a clamp comprising hermaphroditic clamp halves pivotally connected in a scissorlike manner and having clamping jaws defining opposed ends of said clamp; said clamp defining a continuous passageway extending between said clamping jaws; a cable of multiple elements having a peripheral portion fixedly disposed between one pair of said clamping jaws; transverse openings in said clamp halves interconnecting said clamp continuous passageway with the clamp exterior; a first cable element passing from the clamped cable portion along said clamp passageway between the clamping jaws spaced from said one pair; a second cable element passing through said clamp transverse openings; means for simultaneously urging the jaws of one clamp end together and locking a portion of said second cable element passing through said clamp transverse openings to a portion of said clamp halves; each of said clamp halves having an arcuate recess disposed therein and a projecting lug formed in opposed relation on opposite sides of said passageway; the lug of each clamp half being received in the arcuate recess of the other clamp half and coacting therewith whereby said clamp halves may effect such pivotal connection.

8. In combination, an optical fiber cable comprising concentric sheaths spaced apart by interposed, parallel strength members; an optical fiber element disposed in the innermost sheath and extending therefrom at one end; a clamp comprising clamp elements pivotally connected in a scissorlike manner and having spaced pairs of clamping jaws disposed at opposed clamp ends extending from a central clamp body portion, and clampingly engaging concentric elements of said cable; said jaws comprising opposed end portions of said clamp elements whereby said opposed pairs of jaws are simultaneously movable into cable gripping and releasing positions during pivotal movement of said clamp elements; the interval between the jaws in gripping position being such as to enable such jaws at said one end to securely engage the optical fiber cable outer sheath disposed therebetween; the interval between the clamping jaws at the opposed end in grippping position being such as to enable said jaws at said other end to securely engage said optical fiber element disposed therebetween; said clamp elements defining a passageway extending through said clamping jaws in which said cable is received; each clamp element having an arcuate recess and projecting lug formed in opposed relation on opposite sides of said passageway; the lug of each clamp element being received in the recess of the other clamp element and coacting therewith so as to define such pivotal connection between said clamp elements.

9. The clamp of claim 1, 2, 5, 7 or 8 in combination with means for engaging the clamping jaws of one clamp end and urging the same together.

10. In a coaxial cable and clamp assembly having a pair of complementary clamp half portions adapted to move with respect to each other about an axis which is normal to the cable in a pivotal fashion, the improvement comprising a hinge structure formed integrally with the complementary half portions and including a pair of elongate and arcuately shaped recesses formed integrally with at least one of said half portions on opposite sides of the central conductor of said cable and spaced therefrom, and a pair of projections formed integrally with at least one of said half portions; each of said projections being so disposed as to intermate with a corresponding one of said recesses and to be movable therein about said axis so as to effect such pivotal action.

11. In a coaxial cable and clamp assembly having a pair of complementary clamp half portions adapted to pivot with respect to each other about an axis which is normal to the cable in a scissorlike fashion, the improvement according to claim 10 wherein each of said half portions has one of said recesses and one of said projections integrally formed thereon on opposite sides of said cable and wherein said half portions are identical in shape so as to be complementary to each other in assembly about the cable.

12. A clamp construction comprising mating halves configured for assembly in a pivotal relation with one another; said halves defining a passageway therethrough for passage of an element to be clamped by said halves; each of said clamp halves defining a clamping jaw for clampingly engaging an element disposed between said jaw and the corresponding jaw of the other of said halves upon movement of said jaws toward each other in the course of clamp half pivotal movement; each of said halves having an arcuate recess disposed therein and a projecting lug formed in opposed relation on opposite sides of said passageway; the lug of each clamp half being received in the arcuate recess of the other clamp half and coacting therewith whereby said clamp halves may effect such pivotal relation.

13. A clamp construction as in claim 12 wherein said halves are identical to one another and are hermaphroditic.

14. A clamp half adapted to mate with a like clamp half to form a cable clamp; said half having a body portion with a first recess therein for passage of an element to be clamped; said half having a clamping jaw for clampingly engaging a portion of such elment to be clamped; said clamp half having formed therein an arcuate recess and also having integrally formed therewith a projecting lug formed in opposed relation on opposite sides of the first recess; the arcuate recess being adapted to receive the lug of such like clamp half whereby said clamp half may pivotally move into and out of such clamping engagement with such element in the normal course of use.

15. A clamp construction comprising mating halves configured for assembly in a pivotal relation with one another; said halves defining a passageway therethrough for passage of an element to be clamped by said halves; each of said clamp halves defining a clamping jaw for clampingly engaging an element disposed between said jaw and the corresponding jaw of the other of said halves upon movement of said jaws toward each other in the course of clamp half pivotal movement, each of said halves having integrally formed therewith pivot elements comprising a projecting lug and an arcuate recess disposed on opposite sides of said passageway; the pivot elements of each clamp half effecting cooperative interfitting engagement with said pivot elements formed on the other clamp half and coacting therewith whereby said clamp halves may effect such pivotal relation.

* * * * *

UNITED STATES PATENT AND TRADEMARK OFFICE
CERTIFICATE OF CORRECTION

PATENT NO. : 4,395,089

DATED : July 26, 1983

INVENTOR(S) : William H. McKee

It is certified that error appears in the above–identified patent and that said Letters Patent are hereby corrected as shown below:

```
Cover page, in field [63] the filing date of parent ap-
plication Serial No. 943,153 should read -- September 18,
1978 --.
Col. 3, 1. 36 "projections" should read -- projection --.
Col. 6, 1. 56, "fabricion" should read -- fabrication --.
Col. 10, 1. 17, "said" should read -- such --.
```

Signed and Sealed this

Seventeenth Day of April 1984

[SEAL]

Attest:

GERALD J. MOSSINGHOFF

*Attesting Officer*  *Commissioner of Patents and Trademarks*